May 15, 1934.  W. H. SCHRAMM  1,958,901
INSTRUMENT TEST SWITCH
Filed Nov. 25, 1932   3 Sheets-Sheet 2
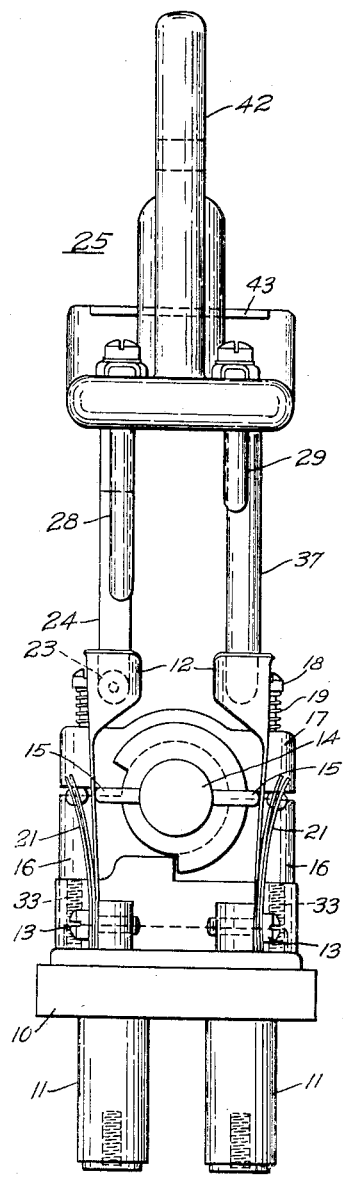
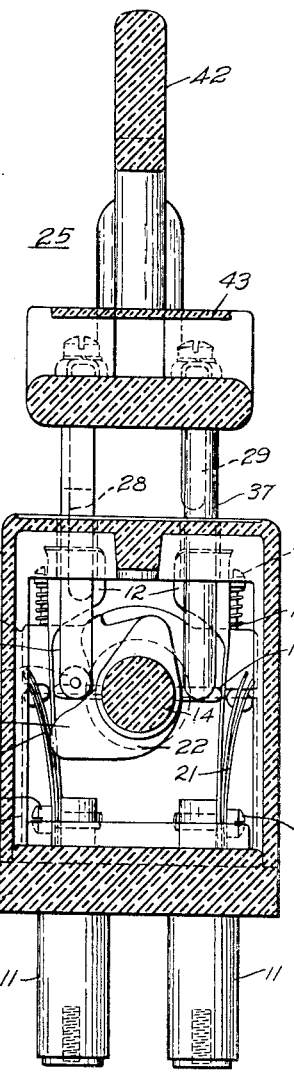
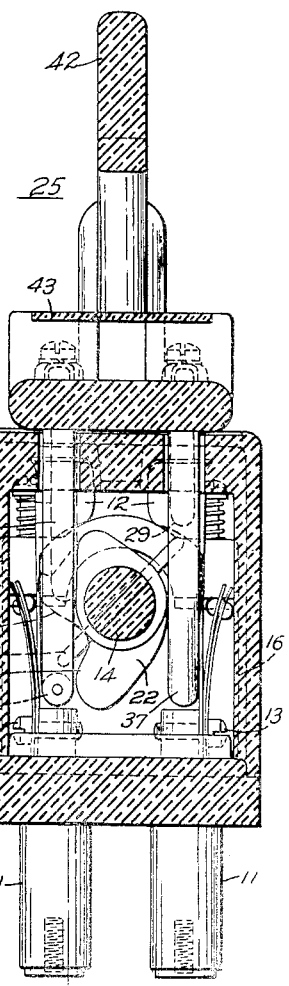
WITNESSES:
INVENTOR
Walter H. Schramm.
BY
ATTORNEY

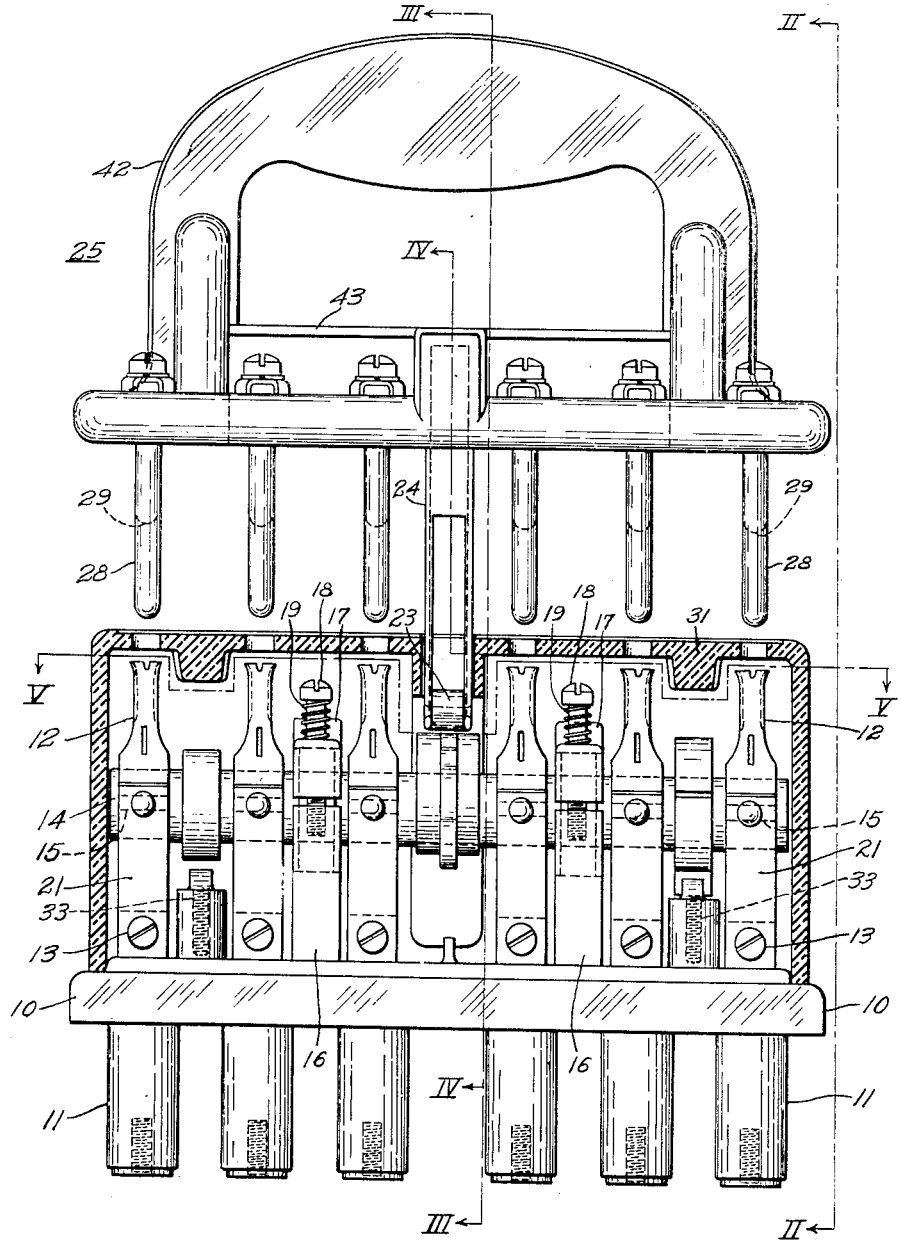

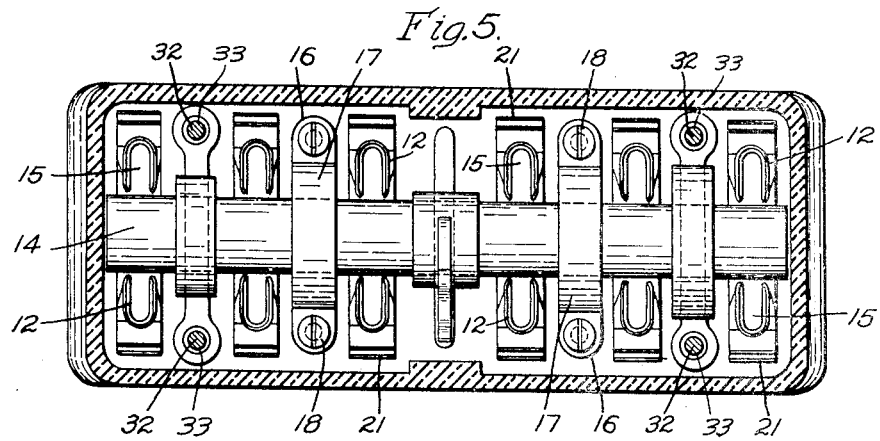
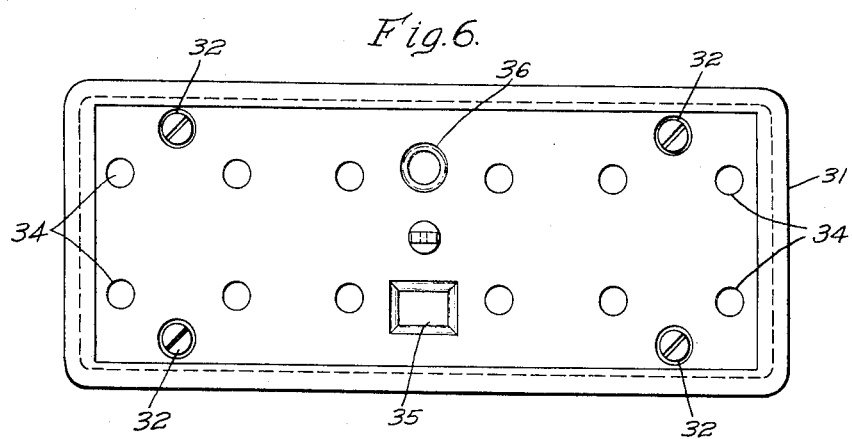
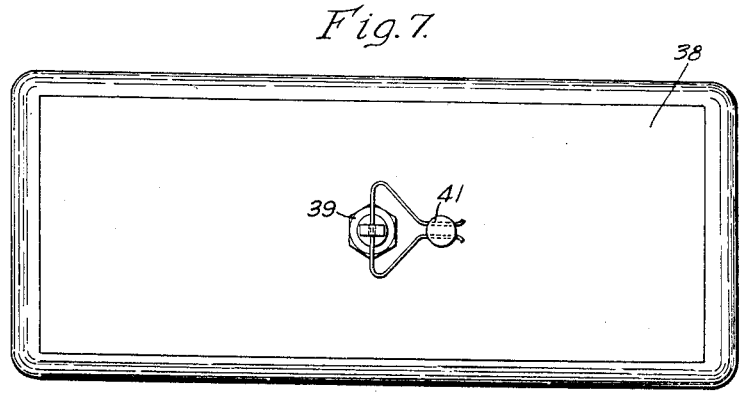

Patented May 15, 1934

1,958,901

UNITED STATES PATENT OFFICE 1,958,901

INSTRUMENT TEST SWITCH

Walter H. Schramm, Pittsburgh, Pa., assignor to Westinghouse Electric & Manufacturing Company, East Pittsburgh, Pa., a corporation of Pennsylvania Application November 25, 1932, Serial No. 644,181

11 Claims. (Cl. 200—51)

My invention relates, generally, to test switches, and, more particularly, to switches for use in testing and calibrating relays and measuring instruments.

An object of my invention, generally stated, is to provide a test switch that shall be simple and convenient in operation and which may be economically manufactured and installed.

A more specific object of my invention is to provide a test switch suitable for multi-circuit testing of switch-board instruments, meters and relays.

Another object of my invention is to provide a test switch that is suitable for mounting upon a switchboard panel and which may be operated from the front of the switchboard, and wherein no live parts are exposed at the front of the switchboard, either when testing or in normal operating service.

A further object of my invention is to provide a test switch by means of which a plurality of instruments may be tested without changing any of the normal connections to the instruments.

Other objects of my invention will be described fully hereinafter or will be apparent to those familiar with the art.

In accordance with my invention, a rotary switch having a plurality of contact members is mounted upon a base and inside of a protecting cover. The rotor of the switch carries a plurality of switch blades which in normal operating position engage the contact fingers, thereby closing the normal circuits to the instruments controlled by the switch.

A test plug is provided with a plurality of studs or contact members which may be inserted through openings in the switch cover to engage the contact fingers of the switch. The test plug is also provided with a small roller, mounted upon an operating arm, which engages an actuating cam on the rotor of the switch and turns the rotor when the plug is inserted into the cover, thereby transferring, shunting or opening the normal circuits through the instruments being tested.

The contact fingers on the switch and the contact members on the plug are so arranged that the test circuits through the instruments are completed in the proper sequence as the plug is inserted. The actuating arm on the rotor is so constructed that the rotor is returned to its normal position when the test plug is removed, thereby restoring the normal operating circuits through the instruments.

For a fuller understanding of the nature and scope of my invention, reference may be had to the following detailed description, taken in conjunction with the accompanying drawings, in which:

Figure 1 is a view, partially in section and partially in side elevation of a test switch and plug, constructed in accordance with my invention;

Fig. 2 is a view in end elevation taken on the line II—II of Fig. 1 of the switch and plug shown in Fig. 1, the switch cover being removed from the switch;

Fig. 3 is a sectional view taken along the line III—III of Fig. 1, the contact members of the test plug being partially inserted in the switch;

Fig. 4 is a sectional view, taken along the line IV—IV of Fig. 1, the contact members of the test plug being fully inserted into the switch;

Fig. 5 is a sectional view, taken along the line V—V of Fig. 1;

Fig. 6 is a top plan view of the switch, showing the openings in the cover for receiving the contact members of the test plug, and Fig. 7 is a top plan view of the switch with the cover plate in position on the switch cover.

Referring to the drawings, the test switch comprises a base 10 which may be formed or molded of any suitable insulating material and adapted for mounting upon a switchboard or instrument panel (not shown). The base 10 is provided with a plurality of terminal studs 11 of sufficient length to extend through the switchboard panel, thereby permitting the wiring connections to be made at the rear of the switchboard panel. In the embodiment of the invention illustrated, the terminal studs 11 are oppositely disposed in the base 10 on two parallel rows, with six studs in each row, thereby providing a test switch having six circuits. However, as many circuits as desired may be readily provided by increasing or decreasing the number of terminal studs.

As illustrated, a resilient contact finger 12 is secured to each of the terminal studs 11 by means of a screw 13. A rotor 14, which carries six switch blades 15, one for each pair of contact fingers, is mounted on the base 10 between the two rows of contact fingers. The rotor 14 may be composed of the same material as the base 10, the switch blades being molded in the rotor. It is mounted on two suitable bearing blocks 16 provided on the base 10 and is retained in position by removable bearing caps 17. The bearing caps 17 are resiliently secured to the bearing blocks by screws 18, a spring 19 being interposed between the cap and the screw, as shown, to prevent the cap from being drawn too tightly against the rotor.

As shown in Fig. 2, each one of the switch blades 15 bridges a pair of contact fingers 12 when the switch rotor 14 is in the closed or normal operating position, thereby establishing an independent electrical circuit through each pair of contact fingers. The contact fingers are backed up with laminated steel springs 21 to insure a high contact pressure between the switch blades and the contact fingers. The contact drop of this construction is remarkably low, compared to that of similar devices.

The rotor 14 also carries an actuating cam 22 which causes the rotor to turn when the cam is engaged by a roller 23, carried by a bifurcated operating arm 24 on the test plug 25. As shown in Figs. 3 and 4, the cam 22 is provided with two operating faces 26 and 27. The face 26 is engaged by the roller 23 to rotate the rotor 14 in a direction to cause the switch blades 15 to be disengaged from the contact fingers 12 when the plug 25 is inserted into the switch, and the face 27 is engaged by the roller to return the rotor to the normal or closed position when the test plug is removed from the switch. The upper part of the cam 22 passes between the two forks of the arm 24 when the rotor 14 is actuated to the open position.

The upper ends of the contact fingers 12 are shaped to receive contact members 28 and 29 which are mounted on the test plug 25 in two parallel rows, and are so spaced as to engage the contact fingers when the plug is inserted into the switch. It will be seen that the contact members on the plug 25 are of two different lengths, the members 28 being longer than the members 29. Accordingly, the contact members 28 engage the one row of contact fingers 12 before the contact members 29 engage the other row of contact fingers, as the test plug is inserted into the switch. The lengths of the contact members are so proportioned that the members 28 engage their respective contact fingers before the switch blades 15 become disengaged from the contact fingers 12, as shown in Fig. 4, and the contact members 29 engage their contact fingers after the switch blades are disengaged from the contact fingers.

It will be seen that the contact fingers 12, the switch blades 15, and the contact members 28 and 29 are so constructed that a wiping action is produced between the contact members when they are actuated either to establish or to interrupt a circuit, thereby preventing burning and pitting of the contact members.

A switch cover 31 is provided for enclosing the rotary switch and the contact fingers 12, thereby preventing accidental contact with any of the live parts of the test switch. The cover 31 is secured on the base 10 by means of four screws 32 which are inserted into openings 33 in the base 10. As shown in Fig. 6, the cover 31 is provided with twelve openings 34 through which the contact members on the test plug may be inserted. The cover 31 is also provided with a rectangular opening 35 for the operating arm 24 and a round opening 36 for a guide member 37 which is mounted on the test plug opposite the operating arm 24 to prevent the plug from being inserted in the switch in the wrong position.

A cover plate 38 prevents dirt from entering the openings 34 and reaching the contact fingers of the switch. The cover plate 38 is secured on top of the switch cover 31 by a nut 39 and may be sealed in position by means of a seal 41, thereby preventing operation of the test switch by unauthorized persons.

The test plug is provided with a handle 42 of a convenient type. The testing instruments may be connected to the desired contact members on the test plug by means of a flexible cable, not shown. A removable cover plate 43 is provided underneath the handle 42 to prevent the hand of the operator from touching the live contact members on the test plug. For convenience, the cover plate 43 may be removed while making the desired connections to the test plug.

In operating the test switch, proper connections are first made to the test plug from the testing equipment, depending upon the type of circuit to be tested. If the circuits contain current transformer secondaries, the secondary windings should be connected to the longer contact members 28 which may be short-circuited during the testing operations. When the proper connections have been made to the test plug it may be inserted in the test switch after removing the cover plate 38 from the switch cover. As the plug is inserted, the contact members 28 engage one row of the contact fingers 12 during the first part of its travel, thereby causing the current transformer secondaries in the circuits of the instruments being tested to be short-circuited. As the plug continues its travel, the roller 23 engages the actuating cam 22 and turns the rotor 14, thereby disengaging the switch blades 15 from the contact fingers 12 and opening the normal operating circuits of the instruments being tested. When the plug is completely inserted into the switch, the contact members 29 engage the other row of contact fingers 12 which are connected to the instruments or relays being tested. There is thus no possibility for the normal operating circuits to come in contact with the test circuits, which may or may not agree in phase or polarity.

When the plug is withdrawn, the roller 23 engages the face 27 of the cam 22 and returns the rotor and the circuits to the normal closed and operating position. Since permanent connections between the switch and the instruments on the switchboard panel are made on the rear of the panel by means of the terminals 11, and all testing operations are accomplished by inserting the test plug from the front, the possibility of leaving wrong connections, loose connections, or broken leads, in the normal circuits after the test is completed, is precluded. Such conditions often occur when the ordinary testing methods are employed.

If desired, a test plug on which the contact members 28 and 29 are of equal length may be provided for use in testing instruments of certain types, as for example, current measuring instruments, when it is important not to break the current transformer secondary circuit. By means of a plug of this type, a standard ammeter may be inserted in series with the instrument being tested without interrupting the normal operating circuit.

From the foregoing description it is apparent that I have provided a test switch which may be readily utilized in testing instruments and circuits of various types, and which permits the testing operations to be performed with safety and convenience, as all testing is done from the front of the switchboard and all live parts of the test switch are protected by the switch cover which need not be removed except for inspection of the contact members of the switch.

I do not desire to be restricted to the specific embodiment of my invention herein shown and described, since it is evident that it may be changed and modified without departing from the spirit and scope of my invention as defined in the appended claims.

I claim as my invention:

1. The combination with a test switch having a plurality of contact fingers and a rotor having switch blades for engaging the contact fingers, of a test plug having means for rotating the switch rotor, and a plurality of contact members of different lengths disposed on the plug for engaging the contact fingers of the switch in a predetermined sequence as the test plug is inserted into the switch.

2. The combination with a test switch having a plurality of contact fingers and a rotatable member having switch blades for engaging the contact fingers, of a test plug having means for actuating the rotatable member to cause the switch blades to disengage the contact fingers, and a plurality of contact members of different lengths disposed on the plug for engaging the contact fingers of the switch in sequential relation as the test plug is inserted into the switch.

3. The combination with a test switch having a plurality of contact fingers and a rotor having switch blades for engaging the contact fingers, of an actuating cam on the rotor, a test plug having means for engaging the cam to rotate the rotor to disengage the switch blades from the contact fingers, and a plurality of contact members of different lengths disposed on the plug for engaging the contact fingers of the switch in sequential relation as the test plug is inserted into the switch.

4. The combination with a test switch having a plurality of contact fingers and a rotor having switch blades for engaging the contact fingers, of an actuating cam on the rotor, a test plug having operating means for engaging the cam to rotate the rotor to disengage the switch blades from the contact fingers, and a plurality of contact members of different lengths disposed on the plug for engaging the contact fingers of the switch in sequential relation as the test plug is inserted into the switch, said operating means being disposed to return the switch blades to a position in which they engage the contact fingers when the plug is removed from the switch.

5. The combination with a test switch having a plurality of contact fingers and a rotor having switch blades for engaging the contact fingers, of an actuating cam having two operating surfaces secured to the rotor, a test plug having operating means for engaging one surface of the cam to rotate the rotor to disengage the switch blades from the contact fingers and a plurality of contact members of different lengths disposed on the plug for engaging the contact fingers of the switch in sequential relation as the test plug is inserted into the switch, said operating means being disposed to engage the other surface of the cam to return the switch blades to a position in which they engage the contact fingers when the plug is removed from the switch.

6. A test switch comprising a supporting base, a plurality of contact fingers on the base, a rotatable switch mounted on the base and having switch blades disposed to engage the contact fingers, a removable test plug having a plurality of contact members for engaging the contact fingers, and means disposed on the plug for actuating the rotatable switch to the open position by inserting the plug into the switch and to the closed position by removing the plug from the switch.

7. A test switch comprising a supporting base, a plurality of contact fingers on the base, a rotatable switch mounted on the base and having switch blades disposed to engage the contact fingers, a cover member for enclosing the contact fingers and the rotatable switch, a removable test plug having a plurality of contact members disposed to be inserted through openings in the switch cover to engage the contact fingers, and means disposed on the plug for actuating the rotatable switch to the open position by inserting the plug into the switch and to the closed position by removing the plug from the switch.

8. A test switch comprising a supporting base, a plurality of contact fingers on the base, a rotatable switch mounted on the base and having switch blades disposed to engage the contact fingers, a cover member for enclosing the contact fingers and the rotatable switch, a removable test plug having a plurality of contact members of different lengths disposed to be inserted through openings in the switch cover to engage the contact fingers, and means disposed on the plug for actuating the rotatable switch to the open position when the plug is inserted into the switch and to the closed position when the plug is removed from the switch, the contact members on the test plug being so proportioned in length that part of the contact fingers are engaged by the contact members before the rotary switch is opened and the remainder of the contact fingers are engaged after the rotary switch is opened.

9. A test switch comprising a supporting base, a plurality of contact fingers disposed on the base in parallel rows, a rotary switch mounted on the base and having switch blades disposed to engage the contact fingers, a cover member for enclosing the contact fingers and the rotary switch, a removable test plug having a plurality of contact members of different lengths mounted thereon in parallel rows and disposed to be inserted through openings in the switch cover to engage the rows of contact fingers in sequential relation, and means disposed on the plug for actuating the rotary switch when the plug is inserted into the switch, said rotary switch being actuated by said means at a predetermined time with respect to the sequence of engagement of the contact fingers by the contact members on the test plug.

10. A test switch comprising a supporting base, a plurality of contact fingers disposed on the base in parallel rows, a rotary switch mounted on the base and having switch blades disposed to engage the contact fingers, a cover member for enclosing the contact fingers and the rotary switch, a removable test plug having a plurality of contact members of different lengths mounted thereon in parallel rows and disposed to be inserted through openings in the switch cover to engage the rows of contact fingers in sequential relation, means disposed on the plug for actuating the rotary switch when the contact members of the plug are inserted through the switch cover, said rotary switch being actuated by said means at a predetermined time with respect to the sequence of engagement of the contact fingers by the contact members on the test plug, and a cover plate disposed to be secured to the switch cover to prevent the test plug from being inserted through the openings in the cover.

11. A test switch comprising a supporting base, a plurality of resilient contact fingers on the base, a rotatable switch mounted on the base and having switch blades disposed to engage said contact fingers, a removable test plug having a plurality of contact members of different lengths for engaging the resilient contact fingers in a predetermined sequence as the test plug is inserted into the switch, and a removable cover member for enclosing the contact fingers and the rotatable switch, said cover member being provided with a plurality of openings through which the contact members on the test plug may be inserted to engage the resilient contact fingers of the switch.

WALTER H. SCHRAMM.